United States Patent [19]

Glenn

[11] Patent Number: 4,891,985

[45] Date of Patent: Jan. 9, 1990

[54] FORCE SENSOR WITH ATTACHED MASS

[75] Inventor: Max C. Glenn, Minnetonka, Minn.

[73] Assignee: Honeywell Inc., Minneapolis, Minn.

[21] Appl. No.: 920,899

[22] Filed: Oct. 16, 1986

Related U.S. Application Data

[63] Continuation of Ser. No. 757,714, Jul. 22, 1985, abandoned.

[51] Int. Cl.[4] .......... G01P 15/08

[52] U.S. Cl. .......... 73/517 R

[58] Field of Search .......... 73/516 R, 517 R, 654, 73/652, 651; 310/329; 338/43; 29/592 R, 595

[56] References Cited

U.S. PATENT DOCUMENTS

| | | | |
|---|---|---|---|
| 3,252,016 | 5/1966 | Hayer et al. | 310/329 |
| 4,064,763 | 12/1977 | Srinivasan | 73/516 R |
| 4,135,408 | 1/1979 | Di Giovanni | 73/721 |
| 4,364,276 | 12/1982 | Shimazoe et al. | 73/721 |
| 4,430,895 | 2/1984 | Colton | 73/517 R |
| 4,445,384 | 5/1984 | Royer | 73/724 |
| 4,454,771 | 6/1984 | Shimazoe et al. | 73/862.68 |
| 4,480,488 | 11/1984 | Read et al. | 73/651 |
| 4,553,436 | 11/1985 | Hansson | 73/517 R |

OTHER PUBLICATIONS

Moskalik, "Tensometric Accelerometers with Overload Protection", *Meas. Tech.*, vol. 22, No. 12, (Dec. 1979), pp. 1469–1471.

Roylance et al., "A Batch-Fabricated Silicon Accelerometer", *IEEE Trans. on Electron Devices*, vol. ED-26, No. 12 (Dec. 1979), pp. 1911–1917.

*Primary Examiner*—John Chapman

*Attorney, Agent, or Firm*—W. T. Udseth

[57] ABSTRACT

A sensor comprising a die having a sensing portion. The sensor further comprises apparatus for enhancing the sensitivity of the sensing portion, the apparatus for enhancing comprising a mass rigidly attached to a portion of the die. The sensor also comprises two mechanical stops. One stop includes a portion of the die, and the other stop is rigidly spaced away from the die. Movement of the mass is limited by the two stops.

3 Claims, 1 Drawing Sheet

FORCE SENSOR WITH ATTACHED MASS

This application is a continuation of application Ser. No. 757,714 filed July 22, 1985, abandoned.

BACKGROUND OF THE INVENTION

The present invention is an improved sensor which has a very high sensitivity to applied acceleration and which is also capable of surviving extreme acceleration or impact overloads.

SUMMARY OF THE INVENTION

The present invention is a sensor comprising a die having a sensing portion. The sensor further comprises apparatus for enhancing the sensitivity of the sensing portion, the apparatus for enhancing comprising a mass rigidly attached to a portion of the die. The sensor also comprises two mechanical stops. One stop includes a portion of the die, and the other stop is rigidly spaced away from the die. Movement of the mass is limited by the two stops.

DETAILED DESCRIPTION OF THE PREFERRED EMBODIMENTS

Figure 1:
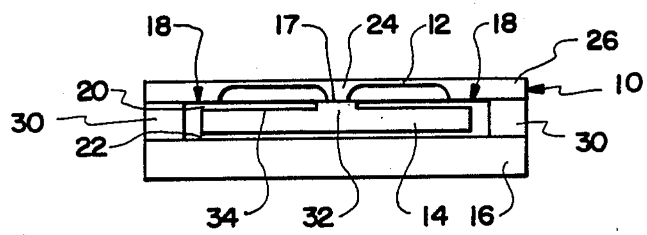
FIG. 1 illustrates a preferred embodiment of the present sensor.
Figure 2:
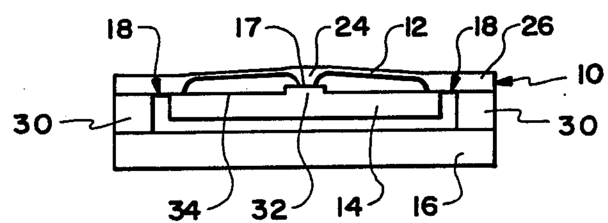
FIG. 2 illustrates the embodiment of FIG. 1 at a limit.
Figure 3:
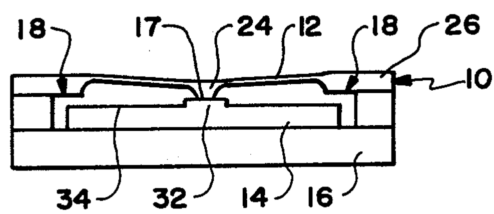
FIG. 3 illustrates the embodiment of FIG. 1 at another limit.

The present sensor comprises a die 10 having a sensing portion 12 and a mass 14 rigidly attached to die 10. The sensor also comprises two mechanical stops. One stop includes a portion of die 10. The other stop 16 is rigidly spaced away from die 10. Movement of mass 14 is limited by the two stops. In one direction (FIG. 2) mass 14 contacts a portion of die 10, in this case bottom surface 18 of die 10. In the other direction (FIG. 3) mass 14 contacts stop 16 rigidly spaced away from die 10. In both cases, the maximum deflection of the diaphragm or sensing portion 12 is determined by the width of gaps 20 and 22 between the two stops.

The present sensor may comprise a housing attached to peripheral support 26 of die 10. In such a case, one of the stops may be formed by a housing bottom 16 rigidly spaced away from peripheral support 26 by vertical supports 30.

Die 10 may be fabricated of silicon or other suitable semiconductor material. Die 10 has a central region 24, a peripheral region or support 26 and, as previously indicated, a flexible annular sensing portion 12. Annular sensing portion 12 is less thick than central region 24 and peripheral support and is defined between central region 24 and peripheral support 26. Central region 24 and peripheral support 26 each have a first surface 17 and 18, respectively.

Die 10 is formed by standard chemical etching techniques. A typical thickness of annular sensing portion 12 is 0.001 inch. A typical die thickness is 0.100 inch. Die 10 may be square having outside dimensions of 0.25 inch by 0.25 inch. The outside diameter of annular sensing portion 12 may be 0.125 inch. The inside diameter of annular sensing portion 12 (also the diameter of central region 24) may be 0.03 inch.

The stress in diaphragm or annular sensing portion 12 can be sensed by forming silicon piezoresistive elements (not shown) in the diaphragm or by depositing a piezoelectric material, such as ZnO, on the surface of diaphragm 12; signal conditioning electronics can be integrated directly into die 10. A typical arrangement of ZnO and electronics can be found by referring to U.S. Pat. 4,445,384.

Mass 14 both enhances the sensitivity of die 10 and limits the movement of sensing portion 12 of the die; accordingly, mass 14 serves as both a proof mass and as an overload protector. Mass 14 is rigidly attached to central region 24 of the die and may have an desired thickness and configuration permitting it to move between the rigid limits formed by peripheral support 26 and stop 16.

Mass 14 is typically fabricated of glass using standard integrated circuit processing techniques. In the preferred embodiment, mass 14 is a square piece of glass 0.180 inch on each side. The preferred embodiment of mass 14 comprises a central pedestal 32 which is 0.019 inch thick and which protrudes 0.0005 inch above the top or first surface 34 of mass 14. Surface 34 extends substantially perpendicular to vertical supports 30. Pedestal 32 is formed by etching the glass of mass 14 in a hydrofluoric acid solution in accordance with standard integrated circuit processing techniques. The height of pedestal 32, which determines the width of gaps 20 and 22, is controlled by the etch. Proof mass 14 is preferrably attached to central region 24 of die 10 using thermal-electric silicon to glass field assisted anodic bonding, a process familiar to those skilled in the art.

Typically, the thermal-electric bonding process comprises lapping both surfaces to be bonded (i.e., the silicon surface and the glass surface) to a flatness of four millionths of an inch, raising the assembled parts up to a temperature of approximately 350 to 500 degrees Centigrade, and then applying a 1000 volt dc electric potential across the parts.

The advantage of such a process in the present device is a bond without an interface material such as epoxy or metal, thus providing the tight tolerance control necessary to control gaps 20 and 22. Glasses which can be bonded to silicon using this technique include a borosilicate glass such as Corning Glass Company type 7740 sold under the trademark "Pyrex" or Corning type 3320, 7056, 7720, or 0120 glass.

In the preferred embodiment shown, the sensor comprises a housing having top 10 formed of silicon die 10, a bottom 16 and vertical support means 30 for separating the top 10 and bottom 16. Vertical supports 30 may comprise, for example, four Pyrex glass pieces, and bottom 16 may comprise a silicon die. Thus, by using silicon die 10, four glass pieces, each piece forming a side, and a die or bottom 16, a completely enclosed housing can be fabricated. Glass pieces 30 are preferrably cut from a plate which has been lapped and polished to the same thickness as the starting material for glass mass 14. Silicon to glass field assisted anodic bonding is again used to attach the glass pieces to die or bottom 16. To complete the fabrication of the sensor assembly, the die/mass assembly is bonded to vertical supports 30, again using field assisted anodic bonding. If vertical supports 30 have a height of 0.020 inch, gaps 20 and 22 are each 0.0005 inch in thickness, assuming that pedestal 32 protrudes 0.0005 inch above first surface 34 of mass 14 as described above.

The sensor assembly as illustrated can be mounted in any variety of standard integrated circuit packages such as a dual-in-line package.

The present invention is to be limited only in accordance with the scope of the appended claims since persons skilled in the art may devise other embodiments still within the limits of the claims. For example, in the description of the present sensor, various details and dimensions have been given. Many variations of these details and dimensions are possible within the scope of the present invention.

The embodiments of the invention in which an exclusive property or right is claimed are defined as follows:

1. A sensor comprising:

a die having a central region, a peripheral support, and a flexible annular sensing portion, the annular sensing portion being less thick than the central region and the peripheral support, the annular sensing portion being located between the central region and the peripheral support;

a housing having an interior surface and including a spacing means, wherein the spacing means is attached to the peripheral support of the die and to the interior surface to thereby rigidly space the interior surface away from the peripheral support of the die; and mass means for enhancing the sensitivity of the die and for limiting the movement of the annular sensing portion of the die, the mass means being rigidly attached to the central region of the die, the mass means having a thickness and configuration permitting it to move between rigid limits formed by the peripheral support of the die and the interior surface of the housing.

2. A sensor, comprising:

a housing having a top, a bottom and vertical support means for separating the top and the bottom;

the top of the housing comprising a die having a central region, a peripheral support, and a flexible annular sensing portion, the annular sensing portion being less thick than the central region and the peripheral support, the annular sensing portion being located between the central region and the peripheral support, the central region and the peripheral support each having a first surface facing a common direction;

the vertical support means of the housing being attached to the first surface of the peripheral support of the die; and mass means rigidly attached to the first surface of the central region of the die for movement between rigid limits formed by the peripheral support of the die and the bottom of the housing.

3. A sensor, comprising:

a die having a central region, a peripheral support, and a flexible annular sensing portion, the annular sensing portion being less thick than the central region and the peripheral support, the annular sensing portion being located between the central region and the peripheral support;

a rigid stop spaced away from the peripheral support of the die; and mass means rigidly attached to the central region of the die for movement between rigid limits formed by the peripheral support of the die and the rigid stop.

* * * * *